United States Patent
Tsurumi

(10) Patent No.: US 6,876,923 B2
(45) Date of Patent: Apr. 5, 2005

(54) MAP DATA PRODUCTION SYSTEM FOR PROVIDING MAP DATA INCLUDING ROAD GRADE DATA

(75) Inventor: Kiyoshi Tsurumi, Obu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/717,467

(22) Filed: Nov. 21, 2003

(65) Prior Publication Data

US 2004/0117111 A1 Jun. 17, 2004

(30) Foreign Application Priority Data

Nov. 22, 2002 (JP) ........................................ 2002-339603

(51) Int. Cl.⁷ ............................................. G01C 21/00
(52) U.S. Cl. ...................... 701/208; 701/200; 701/206; 701/209; 701/211; 701/1; 701/23; 701/24; 701/25; 701/35; 340/995.1; 340/995.12; 340/995.14; 73/178 R
(58) Field of Search ................................ 701/208, 200, 701/206, 209, 211, 1, 23, 24, 25, 35; 340/995.1, 995.12, 995.14; 73/178 R

(56) References Cited

U.S. PATENT DOCUMENTS

| | | | | |
|---|---|---|---|---|
| 5,381,338 A | * | 1/1995 | Wysocki et al. ............ | 701/207 |
| 5,787,233 A | | 7/1998 | Akimoto | |
| 5,838,330 A | * | 11/1998 | Ajima ......................... | 345/427 |
| 5,848,375 A | * | 12/1998 | Nunobiki et al. ........... | 701/212 |
| 6,115,668 A | * | 9/2000 | Kaneko et al. ............. | 701/207 |
| 6,157,342 A | * | 12/2000 | Okude et al. .......... | 342/357.13 |
| 6,199,000 B1 | * | 3/2001 | Keller et al. ................... | 701/50 |
| 2002/0038178 A1 | * | 3/2002 | Talkenberg et al. ......... | 701/200 |
| 2002/0169544 A1 | * | 11/2002 | Hashida ...................... | 701/207 |

FOREIGN PATENT DOCUMENTS

| JP | A-H08-247777 | 9/1996 |
|---|---|---|
| JP | A-H08-304069 | 11/1996 |
| JP | A-H10-267650 | 10/1998 |
| JP | A-2001-50743 | 2/2001 |

* cited by examiner

*Primary Examiner*—William A. Cuchlinski, Jr.
*Assistant Examiner*—Olga Hernandez
(74) *Attorney, Agent, or Firm*—Posz & Bethards, PLC

(57) ABSTRACT

A map data production system includes a workstation, a keyboard, a mouse, a data storage and a display. The data storage stores road map data. A section of a road on a map read from the data storage and displayed on a display. An access road, grade data of which will be added or altered, is specified by clicking its start and end points on the map with the mouse. An elevation value of the road in the specified section is entered at a data entry screen display on the display by a user via the keyboard. A grade value of the road in the specified section is calculated from the entered elevation value and map data stored in the data storage. The calculated grade value is added to the road map data and stored in the data storage.

3 Claims, 2 Drawing Sheets

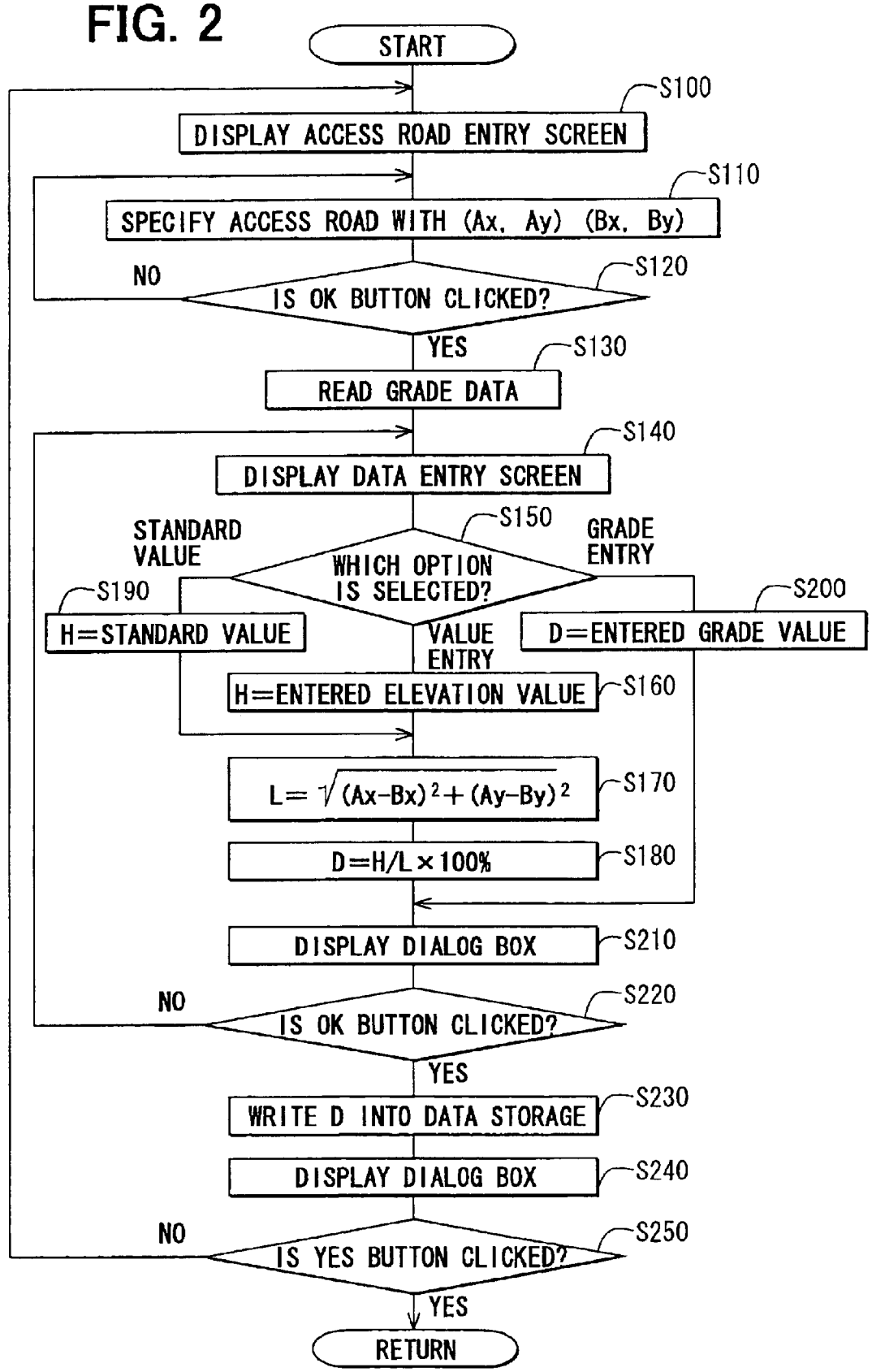

MAP DATA PRODUCTION SYSTEM FOR PROVIDING MAP DATA INCLUDING ROAD GRADE DATA

CROSS REFERENCE TO RELATED APPLICATION

This application is based on and incorporates herein by reference Japanese Patent Application No. 2002-339603 filed on Nov. 22, 2002.

FIELD OF THE INVENTION

The present invention relates to a map data production system for providing map data including road grade data.

BACKGROUND OF THE INVENTION

In a vehicle navigation system, elevations at which a vehicle is located have not been accurately detected. As a result, the current position is erroneously detected when the vehicle is traveling on an elevated road that runs above a ground level road, or on a ground level road that runs below an elevated road. The same error occurs when the vehicle is traveling on a ground level road that runs above an underground road, or on an underground road that runs below a ground level road.

To solve the above problems, adding a determination process a road recognition process is proposed. In the determination process, it is determined whether the grade of the vehicle matches the grade of the road when the vehicle passes through an access road to an elevated road. If they match, it is determined that the vehicle is entering from a ground level road to an elevated road or exiting from an elevated road to a ground level road via an access road.

The grades of access roads must be included in map data to perform the above determination. Most vehicle navigation systems only include two-dimensional map data for route determination, namely, they do not include road grade data.

A map data production system for providing map data including road grade data is proposed in Japanese Patent Application No. JP-A-10-267650. This system includes a measurement device using a global positioning system (GPS) and an inertial navigation measurement device. The system automatically calculates the curvature and the grade of a road from data obtained by the GPS and the inertial navigation measurement device as the vehicle travels. Then, the system generates map data including road grade data.

However, the system can only generate map data on about roads on which the vehicle has been traveled. Large amounts of time and cost are required for obtaining the map data about roads having grades.

SUMMARY OF THE INVENTION

The present invention therefore has an objective to provide a map data production system that produces map data including road grade data without complexity. A map data production system of the present invention includes a road section specifying means, an elevation data entry means, a grade data adding means, a data storing means, and a map data display means.

A section of a road on a map displayed on a display is specified via the road section specifying means. An elevation value of the road in the specified section is entered via the elevation data entry means. A grade value of the road in the specified section is calculated from the entered elevation and map data stored in the data storing means by the grade data adding means. The calculated grade value is stored in the data storing means. With this configuration, the map data including the road grade data is produced without complexity.

Although a measured elevation value should be entered, a value estimated from grade data of a similar elevated road can be used because the road grade data is not necessary to be highly accurate. The road grade data can be added to the map data without measuring the grade of the road. Therefore, the map data including the road grade data can be generated in advance of traveling on the road.

BRIEF DESCRIPTION OF THE DRAWINGS

The above and other objectives, features and advantages of the present invention will become more apparent from the following detailed description made with reference to the accompanying drawings. In the drawings:

FIG. 2 is a flowchart showing a map data generating process performed by a workstation included in the map data production system according to the embodiment.

DETAILED DESCRIPTION OF THE PREFERRED EMBODIMENT

Figure 1:
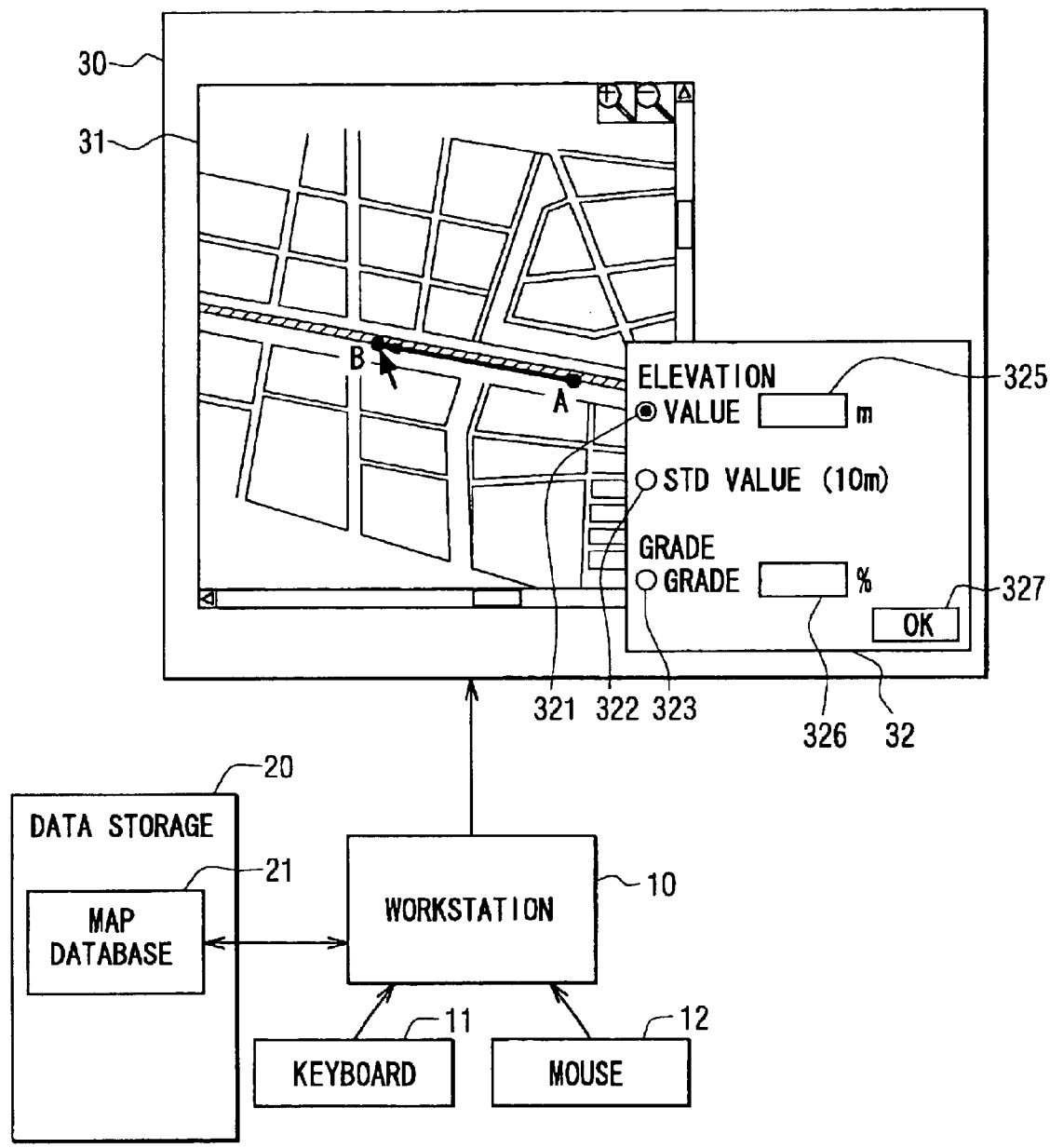
FIG. 1 is a block diagram of a map data production system according to an embodiment of the present invention.

The preferred embodiment of the present invention will be explained with reference to the accompanying drawings.

A map data production system shown in FIG. 1 provides map data to which grade data of roads to existing map data in a vehicle navigation system is added. The system includes a workstation 10, a keyboard 11, a mouse 12, a data storage 20, and a display 30. The workstation 10 performs a map data production process. The keyboard 11 and the mouse 12 are external input devices for the workstation 10. The data storage 20 includes a map database 21. The display 30 provides visual information related to the map data production process.

The workstation 10 includes a CPU, a ROM, a RAM, an I/O, an external storage device, and bus lines for connecting these elements and devices. The workstation 10 performs operations according to procedures stored in the external storage device based on an input from a user via the keyboard 11 or a mouse 12. The workstation 10 controls read and write road map data from and to the map database 21, and outputs control signals for displaying information on the display 30.

The data storage 20 stores the road map data in a rewritable medium such as a magnetic disk. The map database 21 contains road data used for a vehicle navigation system. The data is expressed by forks, nodes showing passing points, links that connect between nodes. The grade data is stored as supplemental data of the links.

The display 30 is a displaying device such as a CRT display monitor and displays images, including a road map, according to the control signals from the workstation 10. The system produces road map data based on inputs provided by the user via the keyboard 11 and the mouse 12 as described below.

An access road input screen is displayed on the display 30. The input screen includes a specific area of the map read from the map database 21. The user can zoom in or out displayed area in the map or display different areas by operating the keyboard 11 or the mouse 12.

The user selects an area including an access road, grade data of which will be added or altered, for display by operating the keyboard 11 or the mouse 12. The access road is specified by clicking its start and end points on the map with the mouse 12.

After the access road is specified, a dialog box with OK and CANCEL button is displayed. If the access road is properly specified, the user clicks the OK button to confirm the entry. If the access road is not properly specified, the user clicks the CANCEL button to start over the specifying step.

When the OK button is clicked, a data entry screen 32 is displayed. The data entry screen includes option buttons 321, 322, 323, a elevation value entry textbox 325, a grade value entry textbox 326, and an OK button 327. The option buttons 321, 322, 323 enables one of options to provide a value that is necessary to determination or acquisition of the grade data. The user can select from elevation value entry, standard elevation value, and grade value entry options by clicking one of the option buttons 321, 322, 323 with the mouse 12.

The user can enter an elevation value in the elevation value entry textbox 325 after clicking the elevation value entry option button 321. The user can enter a grade value in the grade value entry textbox 326 after clicking the grade value entry option button 323. If the grade data of the specified access road has been stored, the grade value is displayed in the grade value entry textbox 326. In this case, the user overwrites the grade value with a new value.

The user clicks on the OK button 327 to confirm the entry when completed with selecting an option and entering a value. Then, a dialog box with OK and CANCEL buttons is displayed. The dialog box contains the data to be written into the data storage 20 and a message for requesting a confirmation of the entry from the user. If the data is not correct, the user clicks the CANCEL button and returns to the data entry screen 32 for reentering a value. If the data is correct and the user has clicked the OK button, the data shown on the display 30 is stored in the data storage 20.

Another dialog box with YES and NO buttons is displayed for requesting a confirmation of the completion of the map data production process from the user. The user clicks the YES button to finish the process. The use clicks the NO button to continue the process and steps described above are repeated.

Referring to FIG. 2, a process performed by the workstation 10 will be discussed. The access road entry screen 31 is displayed on the display 30 (S100). The access road entry screen 31 includes a specific area of the map contained in the map database 21, magnifying glass buttons, and scroll bars. The road map data is read from the map database 21 for displaying the specific area of the map. The magnifying glass buttons are used for zoom in and out the area displayed in the screen 31. The scroll bars are used for changing areas in the screen 31. The user can zoom in and out or change the displayed area of the map by operating the keyboard 11 or the mouse 12.

The access road is specified when points on the map are clicked with the mouse 12 (S110). The point that is first clicked is determined as a start point having the x and y coordinates of (Ax, Ay). The point that is second clicked is determined as an end point having the x and y coordinates of (Bx, By). The section between the start point and the end point is determined as a specified access road. When a point on the map is clicked, a closest node to the clicked point is selected, and the x and y coordinates of the node is read. The link between the nodes is regarded as the specified access road.

When two points (start point and end point) on the map are clicked, a line between the start point and the end point is displayed on the road in the map. A dialog box with OK and CANCEL buttons is displayed on the display 30 for requesting a confirmation of the entry from the user.

When the CANCEL button is clicked (S120), step S110 is repeated. When the OK button is clicked (S120), the grade data of the specified access road (specified link) is read from the map database 21 (S130). The dialog box disappears when either CANCEL button or OK button is clicked.

The data entry screen 32 is displayed on the display 30 (S140). The data entry screen 32 includes the elevation value entry, the standard elevation value, and the grade value entry option buttons 321, 322, 323, the elevation value entry textbox 325, the grade value entry textbox 326, and the OK button 327. The user can enter an arbitrary elevation value in the elevation value entry textbox 325 after clicking on the value entry option button 321. The user can enter an arbitrary grade value in the entry textbox 326 after clicking on the grade entry option button 323. The grade data read from the map database 21 in step S130 is shown in the grade value entry textbox 326 of the data entry screen 32. If grade data of the specified section has not been stored in the map database 21, the grade value entry textbox 326 is left blank.

It is determined whether the OK button 327 is clicked and if the OK button 327 is clicked, it is determined which option button 321, 322, 323 is selected (S150). If the value entry option button is selected, an elevation value entered by the user is assigned to an elevation H (S160). If the standard elevation value option button is clicked, a preset standard elevation value, for instance 10 m, is assigned to the elevation H (S190). If the grade value entry option button is clicked, a grade value entered by the user is assigned to a grade D (S200).

After the entered elevation value or the standard elevation value is assigned to the elevation H, a horizontal distance L of the specified access road is calculated (S170). The distance L is calculated from the x and y coordinates of the start and the end points entered in step S110 using the Pythagorean theorem, $L=((Ax-Bx)^2+(Ay-By)^2)^{-2}$. The grade D is calculated from H and L using an equation, $D=H/L \times 100(\%)$ (S180).

A dialog box with OK and CANCEL buttons is displayed on the display 30 for requesting a confirmation from the user before writing the values (Ax, Ay), (Bx, By), and D to the map database 21 (S210). When the CANCEL button is clicked (S220), steps S140 through S210 are repeated. When the OK button is clicked (S220), the value D is stored into the map database 21 as the grade data of the specified access road (S230). The dialog box disappears when either OK button or CANCEL button is clicked.

A dialog box with YES and NO buttons is displayed on the display 30 for requesting a confirmation from the user before ending the process (S240). When the NO button is clicked (S250), the steps are repeated from step S100. When the YES button is clicked (S250), the process is terminated. The dialog box disappears when either YES button or NO button is clicked.

Step S100 corresponds a map data display means, steps S110 and S120 do a road section specifying means, steps S130 and S140 do a grade data display means, step S140 also do a elevation data entry means and a grade data entry means, and steps S150 to S230 do a grade data adding means.

The grade data is added to the map database with simple operations and the road map data including the grade data is produced without complexity. Although a measured value should be assigned to the elevation H, a value estimated from grade data of a similar elevated road can be used because the grade data is not necessary to be highly accurate. Therefore, the grade data can be added to the map database 21 without measuring the grade of the road.

If the elevated road is a common type of elevate road and its elevation is assumed to be close to the standard value, the elevation value input from the keyboard 11 is not required. The user is only required to select the standard value option by clicking on the standard elevation value option button.

The grade data is directly entered or altered by overwriting a value presented in the textbox 326 if the grade data is known or needed to be altered. This is especially useful for making a decision on whether an alteration is required for the grade data or confirming the grade data.

Furthermore, a road is easily specified because the user is required only to click on points on the map displayed on the display 30. As a result, errors in specifying roads are reduced.

The present invention should not be limited to the embodiment previously discussed and shown in the figures, but may be implemented in various ways without departing from the spirit of the invention. For example, a distance value L1 stored in the map database 21 as a part of the link data can be assigned to the distance L. If the value L1 is a traveling distance, that is, a distance of the slope, rather than the horizontal distance, the formula to calculate the grade will be $D=\tan(\sin^{-1}(H/L1))\times 100(\%)$.

The standard elevation value option and the grade value entry option may not be included and therefore the standard value option and the grade value entry option buttons are not included. The map data production system may only have the elevation value entry option and the grade value entry option. In this case, the standard elevation value option button is not included. Alternatively, the system may only have the elevation value entry option and the standard elevation value option. In this case, the grade value entry option button is not included. The known grade data may not be displayed in the textbox 326, namely, the textbox 326 may be left blank when the grade data entry screen is displayed in step S140.

What is claimed is:

1. A map data production system comprising:

a data storing means for storing road map data;

a map data display means for displaying a map retrieved from the road map data stored in the data storing means;

a map section specifying means for specifying a section of a road on the map displayed on the display;

an elevation data entry means for obtaining elevation data of the section specified with the map section specifying means via an external input device; and a grade data adding means for adding a grade data of the section of the road by calculating a grade of the section from the elevation data and a distance of the section derived from the map data and storing the grade as the grade data in the data storing means, wherein the elevation data entry means includes entry options for selectively enabling a predetermined value entry and an arbitrary value entry via the external input device.

2. The map data production system according to claim 1, further comprising a grade data entry means for obtaining grade data of the specified section of the road via the external input device, wherein the grade data adding means stores the grade data into the data storing means after the grade data entry means has obtained the grade data.

3. The map data production system according to claim 2, further comprising a grade data display means for displaying the grade data of the specified section of the road on the display when the grade data is stored in the data storing means.

* * * * *